(12) United States Patent
Matsumura et al.

(10) Patent No.: US 7,721,863 B2
(45) Date of Patent: *May 25, 2010

(54) ELECTROMAGNETIC CLUTCH FOR COMPRESSOR

(75) Inventors: Tomonori Matsumura, Isesaki (JP); Hirokazu Ichinose, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 225 days.

This patent is subject to a terminal disclaimer.

(21) Appl. No.: 11/373,962

(22) Filed: Mar. 14, 2006

(65) Prior Publication Data

US 2006/0204370 A1 Sep. 14, 2006

(30) Foreign Application Priority Data

Mar. 14, 2005 (JP) ............................. 2005-070869

(51) Int. Cl.
*F16D 27/112* (2006.01)
(52) U.S. Cl. .............................. 192/84.94; 192/84.961; 192/200
(58) Field of Classification Search ............... 192/84.94
See application file for complete search history.

(56) References Cited

U.S. PATENT DOCUMENTS

| | | | | |
|---|---|---|---|---|
| 3,310,141 A | * | 3/1967 | Smirl | 192/84.94 |
| 3,368,657 A | * | 2/1968 | Wrensch et al. | 192/84.94 |
| 3,620,339 A | * | 11/1971 | Becking | 192/84.94 |
| 4,187,939 A | * | 2/1980 | Silvestrini et al. | 192/84.941 |
| 4,296,851 A | * | 10/1981 | Pierce | 192/84.94 |
| 4,616,742 A | * | 10/1986 | Matsushita | 192/84.94 |
| 6,209,699 B1 | * | 4/2001 | Hayashi et al. | 192/84.941 |
| 6,286,650 B1 | * | 9/2001 | Tabuchi et al. | 192/84.94 |
| 7,178,653 B2 | * | 2/2007 | Ichinose et al. | 192/84.94 |
| 7,311,188 B2 | * | 12/2007 | Yoshida et al. | 192/84.941 |
| 2003/0066729 A1 | * | 4/2003 | Feldhaus et al. | 192/48.8 |
| 2005/0045444 A1 | * | 3/2005 | Yoshida et al. | 192/84.941 |
| 2005/0269182 A1 | * | 12/2005 | Hammond et al. | 192/84.961 |
| 2006/0191765 A1 | * | 8/2006 | Ito et al. | 192/84.91 |
| 2006/0219512 A1 | * | 10/2006 | Matsumura et al. | 192/70.18 |

FOREIGN PATENT DOCUMENTS

JP   35830   7/1995

* cited by examiner

*Primary Examiner*—Richard M. Lorence
(74) *Attorney, Agent, or Firm*—Baker Botts, LLP.

(57) ABSTRACT

When an armature plate is attracted to a rotor so that the turning force of the rotor is transmitted to the armature plate, the turning force of the armature plate is transmitted to a main shaft via a plate spring. An angle (hereinafter referred to as a slope angle) formed between the plate spring and the armature plate is set so as to be not smaller than 10° and not larger than 63°. Therefore, since the slope angle is larger than the slope angle (about 3°) of the general electromagnetic clutch, the torque increase effect increases about 5 percent as compared with the general electromagnetic clutch, and also an excessive pressing force of the plate spring does not develop.

4 Claims, 10 Drawing Sheets

F I G. 1
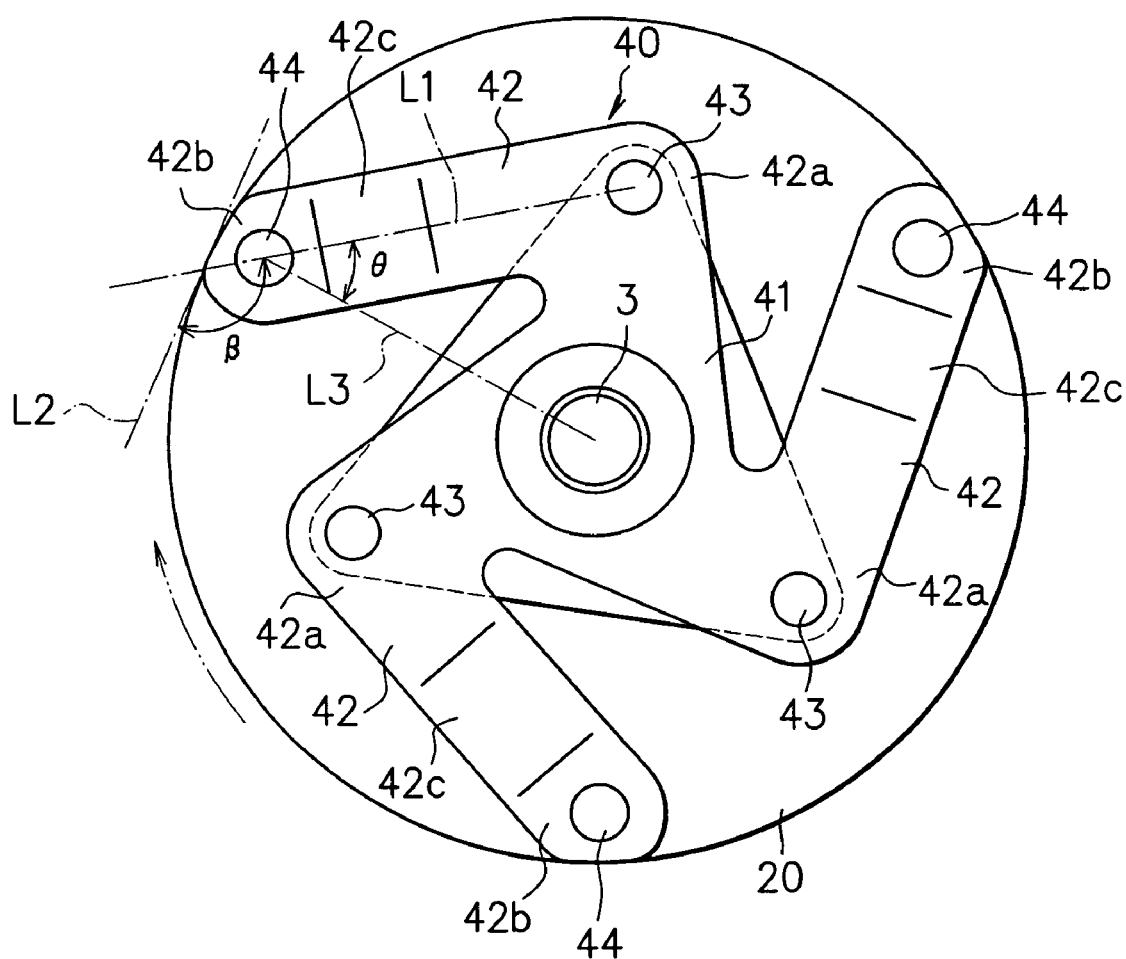

F I G. 3A
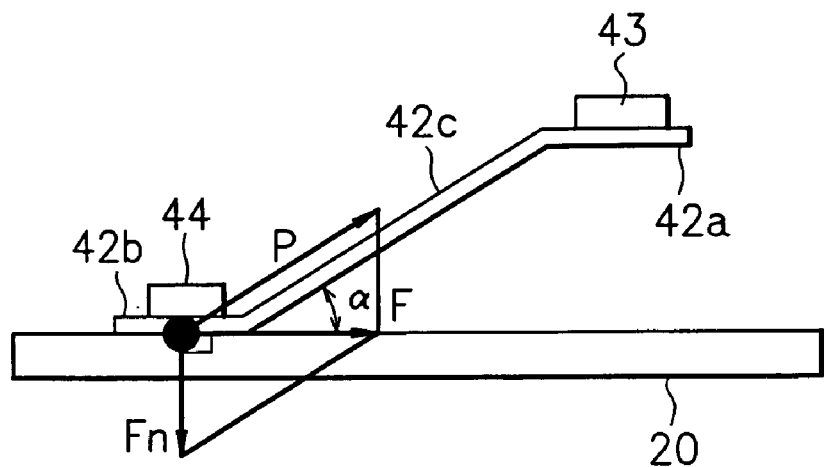
F I G. 3B
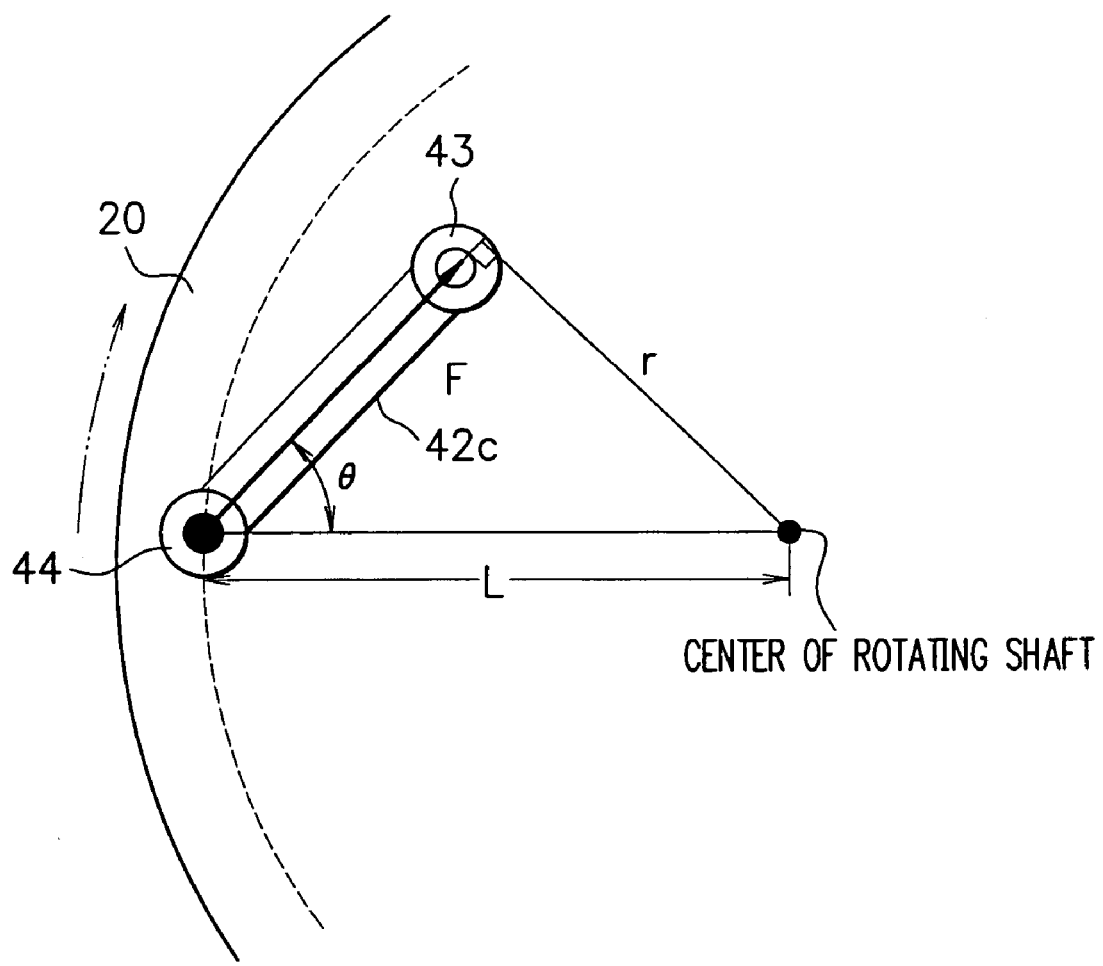
CENTER OF ROTATING SHAFT

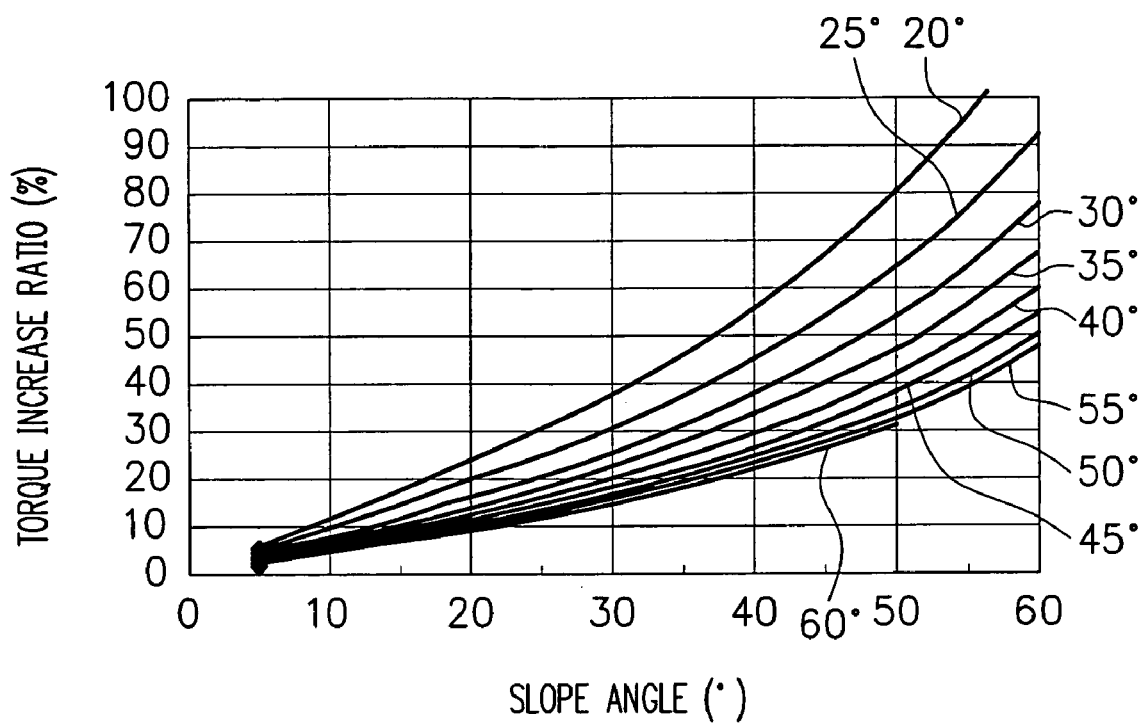
F I G. 4

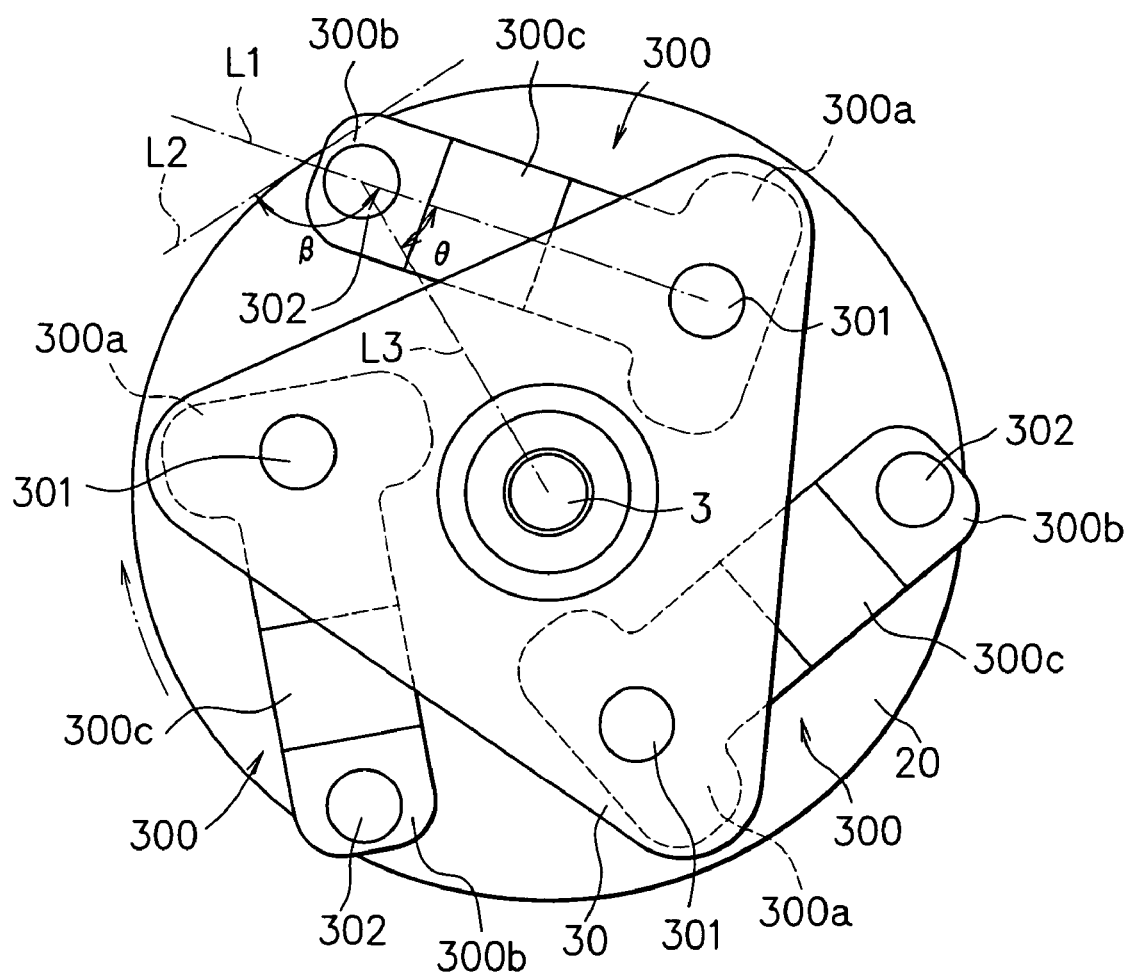
F I G. 7

F I G. 8
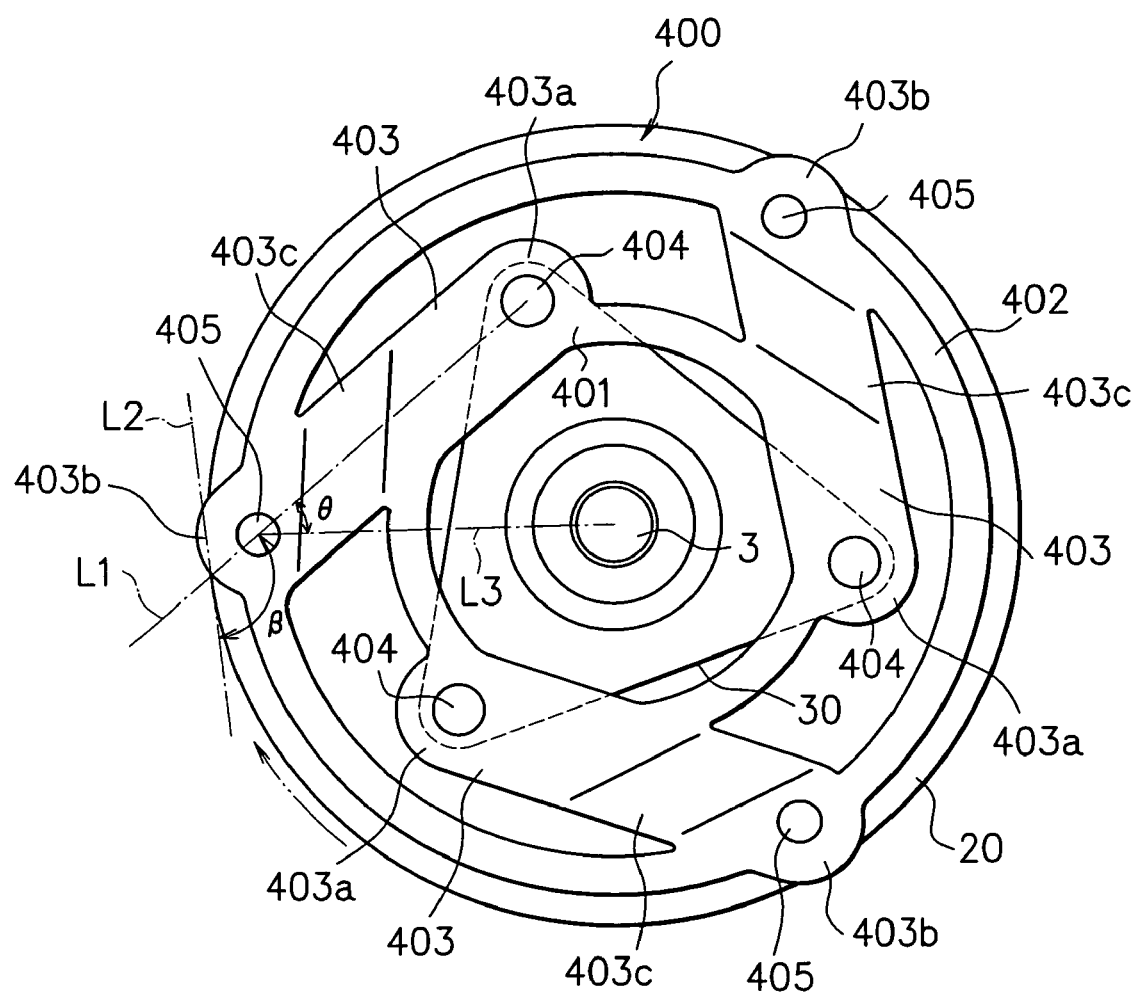

ELECTROMAGNETIC CLUTCH FOR COMPRESSOR

BACKGROUND OF THE INVENTION

1. Field of the Invention

The present invention relates to an electromagnetic clutch for intermittently transmitting the turning force of an external driving source such as an engine to a driving machine such as a compressor.

2. Description of the Related Art

Conventionally, as an electromagnetic clutch of this type, an electromagnetic clutch described, for example, in Japanese Utility Model Publication 7-35830 has been known.

The electromagnetic clutch described in this Publication is constructed so as to have an electromagnetic coil, a rotor rotated by an external driving source, an armature plate facing to the rotor with a clearance provided therebetween, a connecting member connected to a main shaft, and a plate spring for connecting the armature plate to the connecting member.

When the electromagnetic coil is in a deenergized state, the elastic force of the plate spring is given so as to separate the armature plate from the rotor, so that the turning force of the rotor is not transmitted to the armature plate.

On the other hand, when the electromagnetic coil is energized, the armature plate is attracted to the rotor against the elastic force of the plate spring, so that the armature plate is connected to the rotor. By the connection of the two elements, the turning force of the rotor is transmitted to the armature plate, and then the turning force of the armature plate is transmitted to the connecting member via the plate spring. As a result, the turning force of the connecting member is transmitted to the main shaft.

In the case where the external driving source is an automotive engine, and the main shaft is a rotating shaft of a compressor, the compressor is operated intermittently by the intermittent engagement of the electromagnetic clutch.

However, in the above-described conventional electromagnetic clutch, the connection force between the armature plate and the rotor relies on only the magnetomotive force of the electromagnetic coil. As a result, when a compressor with a high torque capacity is manufactured, it is difficult to reduce the weight of electromagnetic clutch and to save electric power because the electromagnetic coil and the rotor inevitably become large in size. Also, since a larger size of the electromagnetic coil increases the self-inductance, the clutch disengages poorly. Therefore, when the armature plate separates from the rotor, a very loud separation sound is emitted. Further, since the magnetomotive force of the electromagnetic coil is large, when the armature plate is connected to the rotor, the time taken until the synchronization of the armature plate with the rotor is short (the armature plate is connected to the rotor in an instant). As a result, a problem arises in that the turning force of the rotor is transmitted to the armature plate as an impact force, so that an adverse influence is exerted on the internal parts of the compressor.

SUMMARY OF THE INVENTION

The present invention has been made to solve the above-described conventional problem, and accordingly an object thereof is to provide an energy-saving and small-sized electromagnetic clutch in which the pressing force of a plate spring can be increased by a simple construction.

A first aspect of the present invention provides an electromagnetic clutch including an electromagnet coil through which a current is caused to flow; a rotor to which power is transmitted from the outside; an armature plate facing to the rotor with a clearance provided therebetween; and a plate spring one end of which is connected to the main shaft side of a driving source such as a compressor and the other end of which is connected to the armature plate, constructed so that when the electromagnetic coil is in a deenergized state, the elastic force of the plate spring is given so as to separate the armature plate from the rotor, and on the other hand, when the electromagnetic coil is energized, the armature plate is attracted to the rotor by the magnetomotive force of the electromagnetic coil, and when the armature plate is attracted to the rotor, an angle formed between the plate spring and the armature plate is set so as to be not smaller than 10° and not larger than 63°.

According to the first aspect of the present invention, when the armature plate is attracted to the rotor so that the turning force of the rotor is transmitted to the armature plate, the turning force of the armature plate is transmitted to the main shaft via the plate spring. In the first aspect of the present invention, an angle formed between the plate spring and the armature plate (hereinafter referred to as a slope angle) is set so as to be not smaller than 10° and not larger than 63°, being larger than the slope angle (about 3°) of the general electromagnetic clutch. According to an experiment, when the slope angle was set at 10°, the torque increase effect increased about 5 percent as compared with the general electromagnetic clutch. The reason why the slope angle is set at 63° or smaller is to solve a problem in that if the slope angle exceeds 63°, the pressing force of the plate spring is too strong, so that even if the electromagnetic coil is deenergized, the armature plate is difficult to separate from the rotor.

A second aspect of the present invention provides an electromagnetic clutch including an electromagnet coil through which a current is caused to flow; a rotor to which power is transmitted from the outside; an armature plate facing to the rotor with a clearance provided therebetween; and a plate spring one end of which is connected to the main shaft side of a driving source such as a compressor and the other end of which is connected to the armature plate, constructed so that when the electromagnetic coil is in a deenergized state, the elastic force of the plate spring is given so as to separate the armature plate from the rotor, and on the other hand, when the electromagnetic coil is energized, the armature plate is attracted to the rotor by the magnetomotive force of the electromagnetic coil, and the extension direction of the plate spring extending from one end of the plate spring toward the other end thereof intersects the rotation direction of the armature plate at an obtuse angle, and intersects, at an acute angle, the connecting line direction in which the center of the main shaft and the center of the plate spring connecting portion of the armature plate are connected.

According to the second aspect of the present invention, the extension direction intersects the rotation direction of the armature plate at an obtuse angle, when the turning force is transmitted from the rotor to the armature plate, a compressive force is generated on the plate spring so as to be directed from the armature plate to the main shaft side. Since a plate spring generally has a slope angle, this compressive force acts as a pressing force for pressing the armature plate on the rotor.

Also, an angle formed between the extension direction of the plate spring and the connecting line direction in which the center of the main shaft and the center of the plate spring connecting portion of the armature plate are connected (hereinafter referred to as an arrangement angle) is acute. Here, as the arrangement angle decreases (larger than 0°), the above-described compressive force generated on the plate spring increases.

A third aspect of the present invention provides an electromagnetic clutch in which the plate spring has both of the slope angle (10° to 63°) in accordance with the first aspect of the present invention and the arrangement angle in accordance with the second aspect of the present invention.

According to the third aspect of the present invention, the operation of the second aspect of the present invention synergistically acts on the operation of the first aspect of the present invention. Thereby, the pressing force on the armature plate is further increased, so that the energy saving and miniaturization of electromagnetic clutch can be achieved surely.

The above and other objects and features of the present invention will become more apparent from the following description and the accompanying drawings.

BRIEF DESCRIPTION OF THE DRAWINGS

FIG. 1 is a front view of an electromagnetic clutch in accordance with a first embodiment;

FIGS. 3A and 3B are explanatory views of the self-boosting action of an electromagnetic clutch in accordance with a first embodiment;

FIG. 4 is a graph showing torque increase ratio as a function of slope angle and arrangement angle of an electromagnetic clutch in accordance with a first embodiment;

FIG. 7 is a front view of an electromagnetic clutch in accordance with a fourth embodiment;

FIG. 8 is a front view of an electromagnetic clutch in accordance with a fifth embodiment;

DESCRIPTION OF THE PREFERRED EMBODIMENTS

Figure 2:
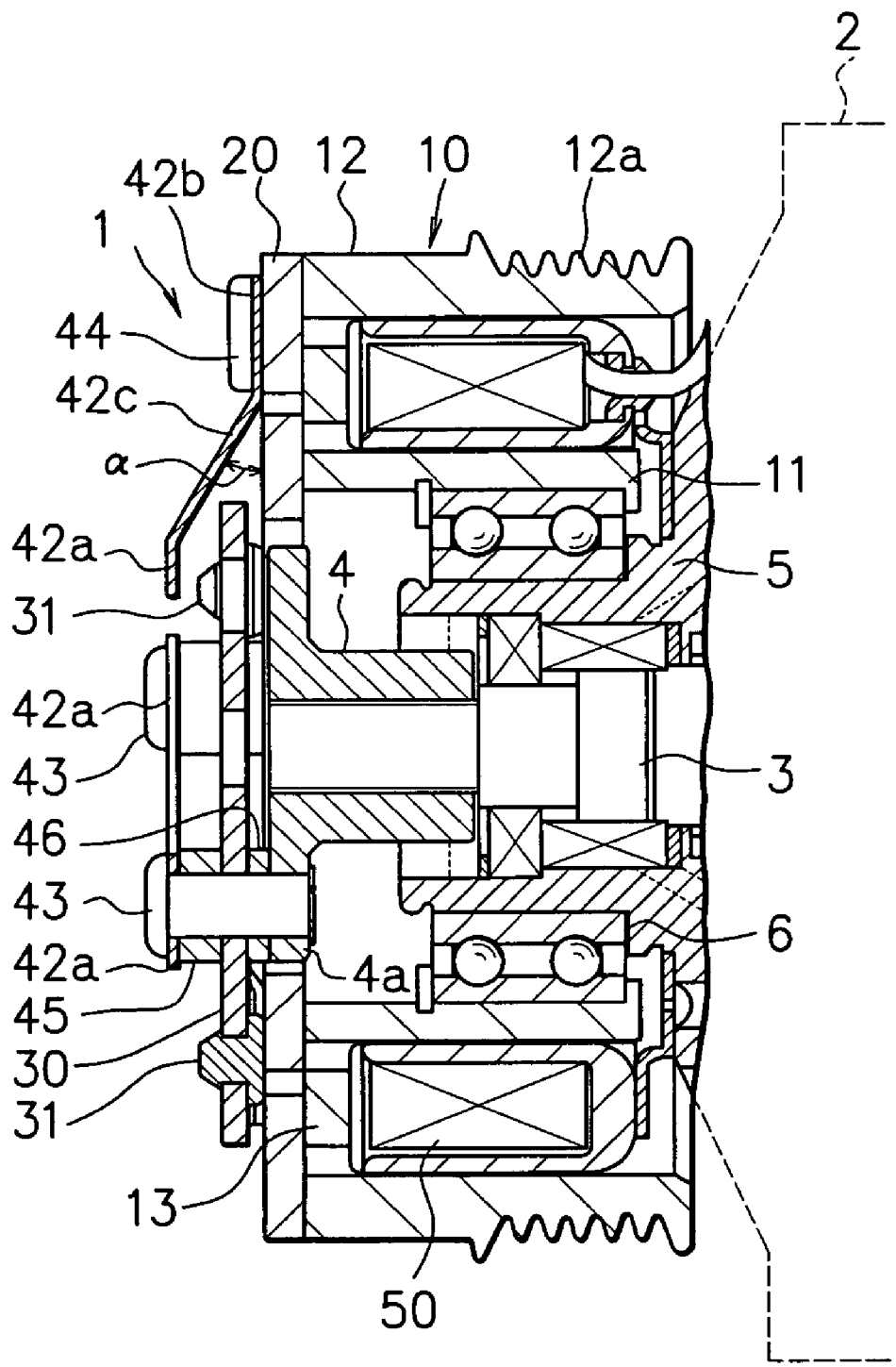
FIG. 2 is a sectional view of an electromagnetic clutch in accordance with a first embodiment.

FIGS. 1 to 4 show a first embodiment of an electromagnetic clutch in accordance with the present invention.

An electromagnetic clutch 1 in accordance with this embodiment is used for a compressor 2, and has a function of intermittently transmitting turning force to a rotating shaft 3 of the compressor 2. The distal end of the rotating shaft 3 is threadedly engaged with a boss portion 4 having an annular flange 4a so that the turning force from the electromagnetic clutch 1 is transmitted through the flange 4a as described later.

The electromagnetic clutch 1 has a ring-shaped rotor 10, an armature plate 20, a connecting plate 30, and a plate spring 40.

The rotor 10 consists of an inner ring 11, an outer ring 12, and a front plate 13 for connecting the front ends of the inner ring 11 and the outer ring 12 to each other, and an electromagnetic coil 50 is interposed between the inner ring 11 and the outer ring 12. When the electromagnetic coil 50 is energized, the whole of the rotor 10 acts as an electromagnet to attract the armature plate 20.

In a belt setting groove 12a formed in the outer ring 12 of the rotor 10, a belt (not shown) for transmitting the turning force of an external driving source, for example, a not illustrated automotive engine, is set windingly. Also, a front housing 5 of the compressor 2 penetrates on the inside of the inner ring 11, and further a ball bearing 6 is interposed between the front housing 5 and the inner ring 11. By configuring the rotor 10 as described above, the turning force of the engine is transmitted to the rotor 10 so that the rotor 10 rotates around the front housing 5.

The armature plate 20 is formed of a magnetic material, for example, an iron-base material. Also, the armature plate 20 is formed into a ring shape, and is arranged so as to face to the front plate 13 of the rotor 10 with a gap provided therebetween.

The connecting plate 30 is disposed in front of the armature plate 20 with a clearance provided therebetween. As shown in FIG. 1, the connecting plate 30 is formed by a metal plate formed into a substantially equilateral triangular shape. At appropriate places of the connecting plate 30, vibration-proof rubber 31 insulators are fixed. The vibration-proof rubber 31, which penetrates the connecting plate and abuts on the front surface of the armature plate 20, has a function of damping the vibration of the connecting plate 30.

The plate spring 40 has, as shown in FIG. 1, a substantially triangularly-shaped common plate 41 disposed in the center and three spring bodies 42 extending in the radial direction from the corners of the common plate 41. One end 42a of each of the spring bodies 42 is fixed at the corner of the connecting plate 30 with a rivet 43, and the other end 42b thereof is fixed to the armature plate 20 with a rivet 44. The elastic force of the plate spring 40 is given so as to separate the armature plate 20 from the front plate 13 of the rotor 10. The rivet 43 penetrates one end 42a of the plate spring 40, a washer 45, the connecting plate 30, a washer 46, and the flange 4a of the boss portion 4 in succession, and connects the elements 42a, 45, 30, 46 and 4a to each other. Thereby, the turning force transmitted through the plate spring 40 is transmitted to the boss portion 4.

The spring body 42 is, as shown in FIG. 1, extended from one end 42a toward the other end 42b so that the extension direction intersects, at an obtuse angle, the rotation direction (indicated by the arrow mark of two-dot chain line in FIG. 1) of the armature plate 20. Specifically, as shown in FIG. 1, the extension direction (two-dot chain line L1) of the spring body 42 and the tangential line (two-dot chain line L2) at a point at which the extension direction intersects the outer periphery of the armature plate 20 make an obtuse angle β.

Also, as shown in FIG. 2, one end 42a and the other end 42b of the spring body 42 are formed in parallel with the connecting plate 30 and the armature plate 20; in contrast, a portion between one end 42a and the other end 42b has an inclining portion 42c inclining slantwise, and the inclining portion 42c is at a predetermined angle (slope angle α) to the armature plate 20.

Further, as shown in FIG. 1, the extension direction (two-dot chain line L1) of the spring body 42 and the connecting line direction (two-dot chain line L3) in which the center of the rotating shaft 3 and the center of the rivet 44 are connected intersect at a predetermined angle (arrangement angle θ), this arrangement angle θ being an acute angle.

According to this embodiment, when the electromagnetic coil 50 is in a deenergized state, the rotor 10 and the armature plate 20 are separated from each other, so that the turning force of the rotor 10 is not transmitted to the armature plate 20.

On the other hand, when the electromagnetic coil 50 is energized, the rotor 10 acts as an electromagnet. Thereby, a magnetomotive force is generated on the rotor 10, so that the armature plate 20 is attracted to the front plate 13 of the rotor 10 against the elastic force of the plate spring 40, and thereby the rotor 10 and the armature plate 20 are connected to each other. By the connection of the two elements, the turning force of the rotor 10 is transmitted to the armature plate 20, and this turning force is transmitted to the plate spring 40, the connecting plate 30, the boss portion 4, and the rotating shaft 3 in succession, by which the rotating shaft 3 is rotated. Due to the turning force of the rotating shaft 3, the compressor 2 accomplishes refrigerant sucking/compressing action.

In the electromagnetic clutch 1 in accordance with this embodiment, since the rotation direction of the armature plate 20 intersects the extension direction of the plate spring 40 at the obtuse angle β, the turning force of the armature plate 20 acts as the compressive force to the spring body 42. Also, since the inclining portion 42c of the spring body 42 has the slope angle α, the downward component of this compressive force acts as a pressing force that presses the armature plate 20 toward the rotor 10. Further, the pressing force changes depending on the degrees of the slope angle a and the arrangement angle θ.

The above-described action is explained with reference to the explanatory views of FIGS. 3A and 3B. In FIGS. 3A and 3B, when the compressive force is taken as P, the horizontal component of the compressive force P as F, the pressing force as Fn, the transmission force due to the friction between the armature plate 20 and the rotor 10 as T, the frictional resistance between the armature plate 20 and the rotor 10 as μ, the distance between the center of the rivet 44 and the center of the rotating shaft 3 as L, the length of the perpendicular from the center of the rotating shaft 3 to the line of action of the force F as r, the slope angle as α, the arrangement angle as θ, and the torque generated by the pressing force as Tn, the generated toque of the electromagnetic clutch 1 can be calculated as described below.

$$F = T/r \qquad \text{A1}$$

$$r = L \cdot \sin\theta \qquad \text{A2}$$

Substitution of Equation A2 into Equation A1 yields $$F = T/(L \cdot \sin\theta) \qquad \text{A3}$$

On the other hand, $$Fn = F \cdot \tan\alpha \qquad \text{A4}$$

Substitution of Equation A3 into Equation A4 yields $$Fn = T \cdot \tan\alpha/(L \cdot \sin\theta) \qquad \text{A5}$$

Also, $$Tn = \mu \cdot Fn \cdot L \qquad \text{A6}$$

Substitution of Equation A5 into Equation A6 yields $$Tn = T \cdot \mu \cdot \tan\alpha/(\sin\theta) \qquad \text{A7}$$

From the above respect, the static friction torque of the armature plate 20 and the rotor 10 is in a state in which the torque Tn of the plate spring 40 is added. Also, it is found that as the slope angle α increases, the torque Tn increases, and as the arrangement angle θ decreases, the torque Tn increases.

A change in torque increase ratio with respect to the slope angle α and the arrangement angle θ was studied experimentally, and the result shown in FIG. 4 was obtained. In this experiment, plate springs having the arrangement angle θ of every 5° from 20° to 60° were prepared, and plate springs having the slope angle α of every 5° from 5° to 60° were prepared. As the result of this experiment, it was verified that as the slope angle α increases and as the arrangement angle θ decreases, the torque increase ratio becomes higher.

Also, according to this experiment, when the slope angle was set at 10°, the torque increase effect increased about 5 percent as compared with the general electromagnetic clutch (slope angle 3°).

The reason why the slope angle was set at 63° or smaller is to solve a problem in that if the slope angle exceeds 63°, the pressing force is too strong, so that even if the electromagnetic coil 50 is deenergized, the armature plate 20 is difficult to separate from the rotor 10. Therefore, it was found that slope angles in the range of 10° to 63° are most favorable.

As described above, according to the electromagnetic clutch 1 in accordance with this embodiment, the current to the electromagnetic coil 50 can be decreased, and also the number of turns of the electromagnetic coil 50 can be decreased. As a result, the size and weight of the rotor 10 can be reduced, and also electric power can be saved. As the size of the electromagnetic coil 50 is decreased, the self-inductance decreases, so that the electromagnetic clutch 1 disengages right. As a result, the separation sound generated when the armature plate 20 separates from the rotor 10 can be made feeble.

Figure 5:
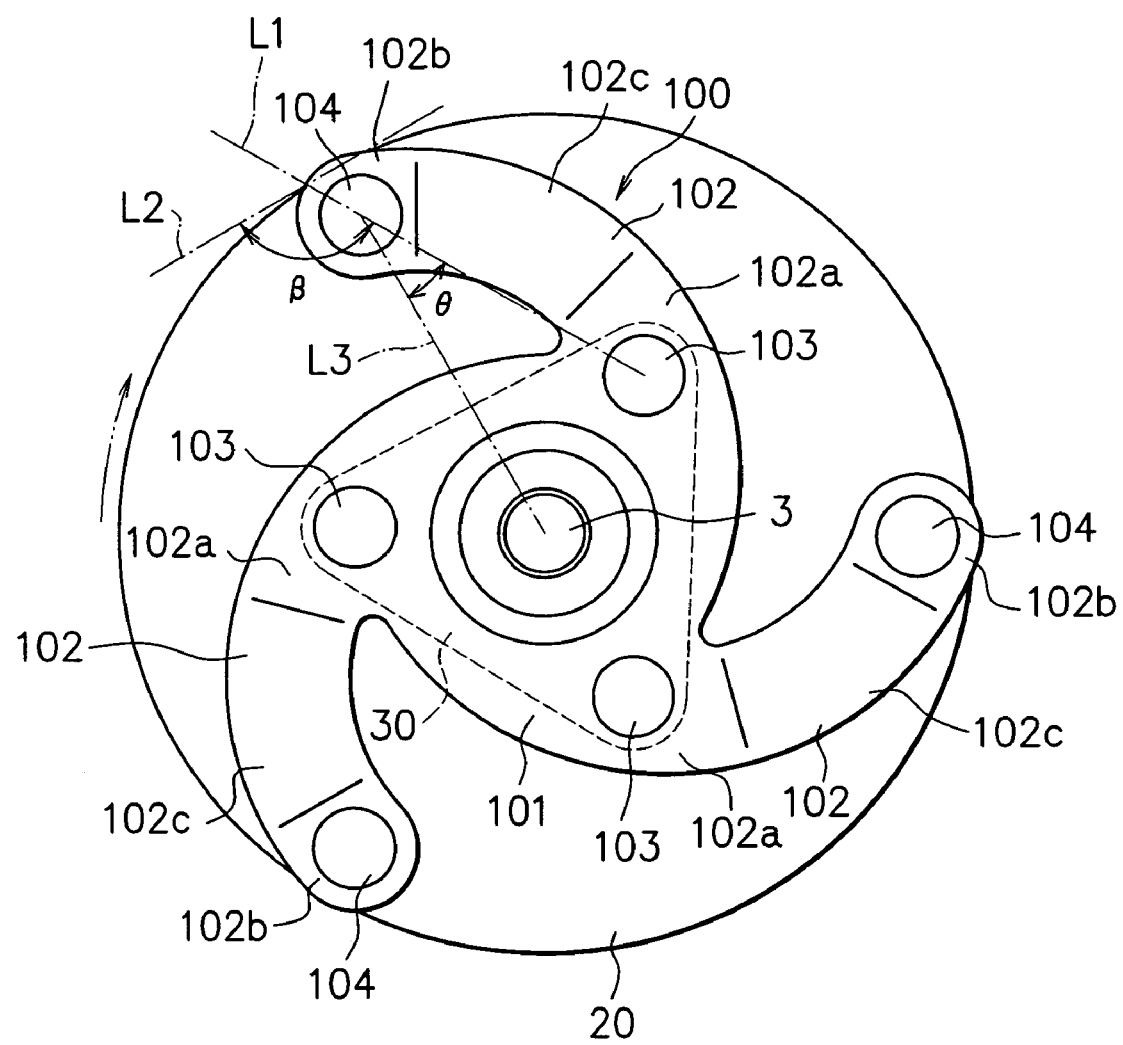
FIG. 5 is a front view of an electromagnetic clutch in accordance with a second embodiment.

FIG. 5 shows a second embodiment of an electromagnetic clutch. In this embodiment, the same symbols are applied to elements that are common to those in the first embodiment, and the explanation thereof is omitted.

A plate spring 100 in accordance with this embodiment has a common plate 101 and three spring bodies 102 extending in the radial direction from the corners of the common plate 101. One end 102a of each of the spring bodies 102 is fixed at the corner of the connecting plate 30 with a rivet 103, and the other end 102b thereof is fixed to the armature plate 20 with a rivet 104. The elastic force of the plate spring 100 is given so as to separate the armature plate 20 from the front plate of the rotor. The spring body 102 is formed into an arcuate shape, and is formed with an inclining portion 102c as in the first embodiment. This embodiment achieves the same operational effects as those of the first embodiment. Other configurations are the same as those of the first embodiment.

Figure 6:
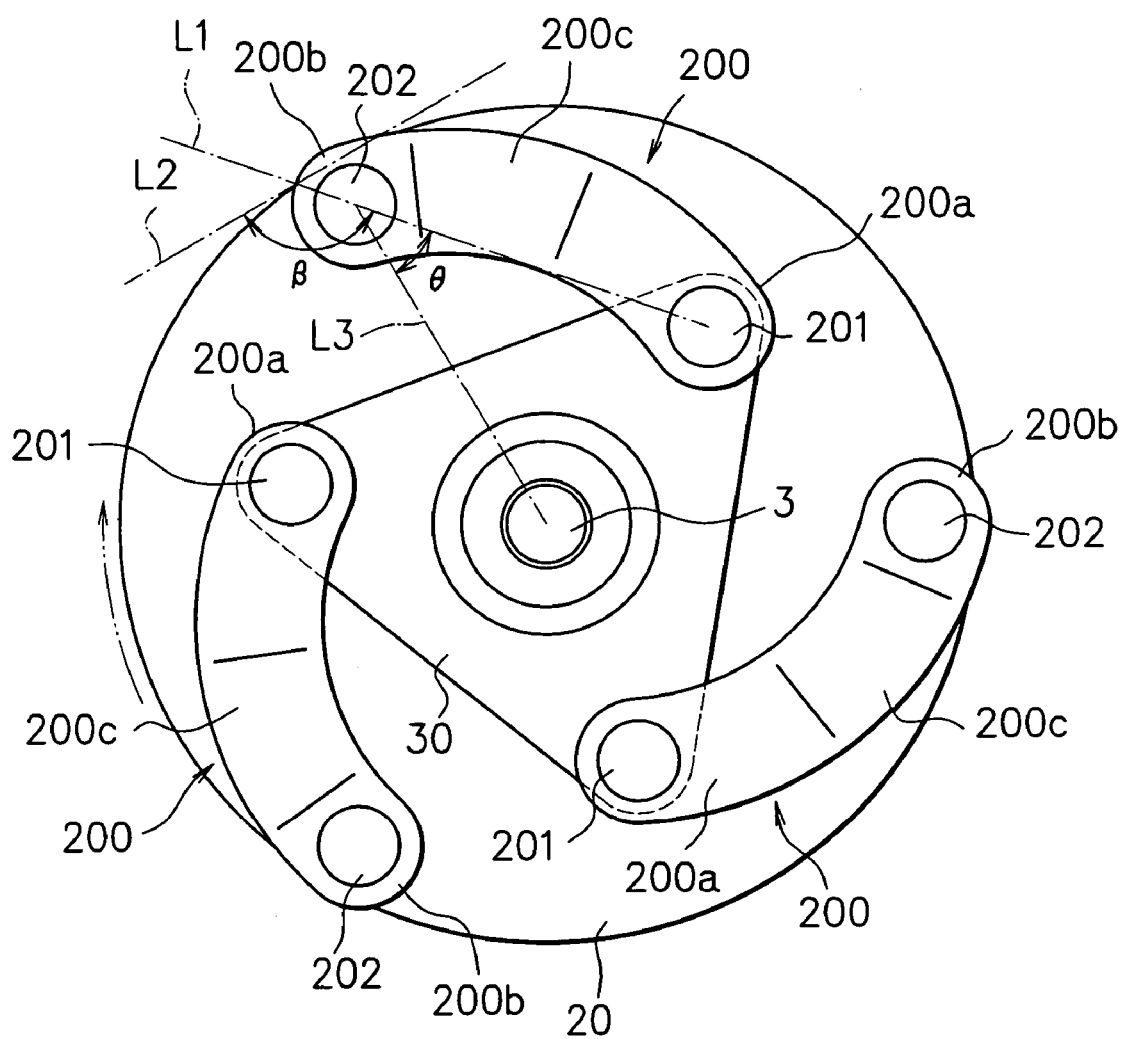
FIG. 6 is a front view of an electromagnetic clutch in accordance with a third embodiment.

FIG. 6 shows a third embodiment of an electromagnetic clutch. In this embodiment, the same symbols are applied to elements that are common to those in the first embodiment, and the explanation thereof is omitted.

Three plate springs 200 in accordance with this embodiment extend in the radial direction from the corners of the connecting plate 30. One end 200a of each of the plate springs 200 is fixed at the corner of the connecting plate 30 with a rivet 201, and the other end 200b thereof is fixed to the armature plate 20 with a rivet 202. The elastic force of the plate spring 200 is given so as to separate the armature plate 20 from the front plate of the rotor. Also, the plate spring 200 is formed into an arcuate shape, and is formed with an inclining portion 200c as in the first embodiment. This embodiment also achieves the same operational effects as those of the first embodiment. Other configurations are the same as those of the first embodiment.

FIG. 7 shows a fourth embodiment of an electromagnetic clutch. In this embodiment, the same symbols are applied to elements that are common to those in the first embodiment, and the explanation thereof is omitted.

Plate springs 300 in accordance with this embodiment extend in the radial direction from the corners of the connecting plate 30. Each of the plate springs 300 is formed substantially into a T shape, and one end 300a thereof is wide. One end 300a of the plate spring 300 is fixed at the corner of the connecting plate 30 with a rivet 301, and the other end 300b thereof is fixed to the armature plate 20 with a rivet 302. The elastic force of the plate spring 300 is given so as to separate the armature plate 20 from the front plate of the rotor. Also, an inclining portion 300c similar to the inclining portion 42c of the first embodiment is formed.

Since the one end 300a side of the plate spring 300 in accordance with this embodiment is wide, the contact area of the plate spring 300 with the connecting plate 30 is large. As a result, the connection strength of the plate spring 300 increases. Other configurations and operations are the same as those of the first embodiment.

FIG. 8 shows a fifth embodiment of an electromagnetic clutch. In this embodiment, the same symbols are applied to elements that are common to those in the first embodiment, and the explanation thereof is omitted.

A plate spring 400 in accordance with this embodiment has an annular inside plate 401 formed close to the center of the armature plate 20, an annular outside plate 402 formed close to the peripheral edge of the armature plate 20, and three spring bodies 403 extending integrally so as to connect the inside plate 401 to the outside plate 402. One end 403a of each of the spring bodies 403 is fixed at the corner of the connecting plate 30 with a rivet 404, and the other end 403b thereof is fixed to the armature plate 20 with a rivet 405. The elastic force of the spring body 403 is given so as to separate the armature plate 20 from the front plate of the rotor. Also, an inclining portion 403c similar to the inclining portion 42c of the first embodiment is formed.

According to this embodiment, since the annular inside plate 401 and the annular outside plate 402 are formed over the whole of the armature plate 20, the elastic forces of the spring bodies 403 are applied to the whole of the armature plate 20. Thereby, the armature plate 20 is attracted to and separated from the rotor 10 in a well-balanced manner. Other configurations and operations are the same as those of the first embodiment.

Figure 9:
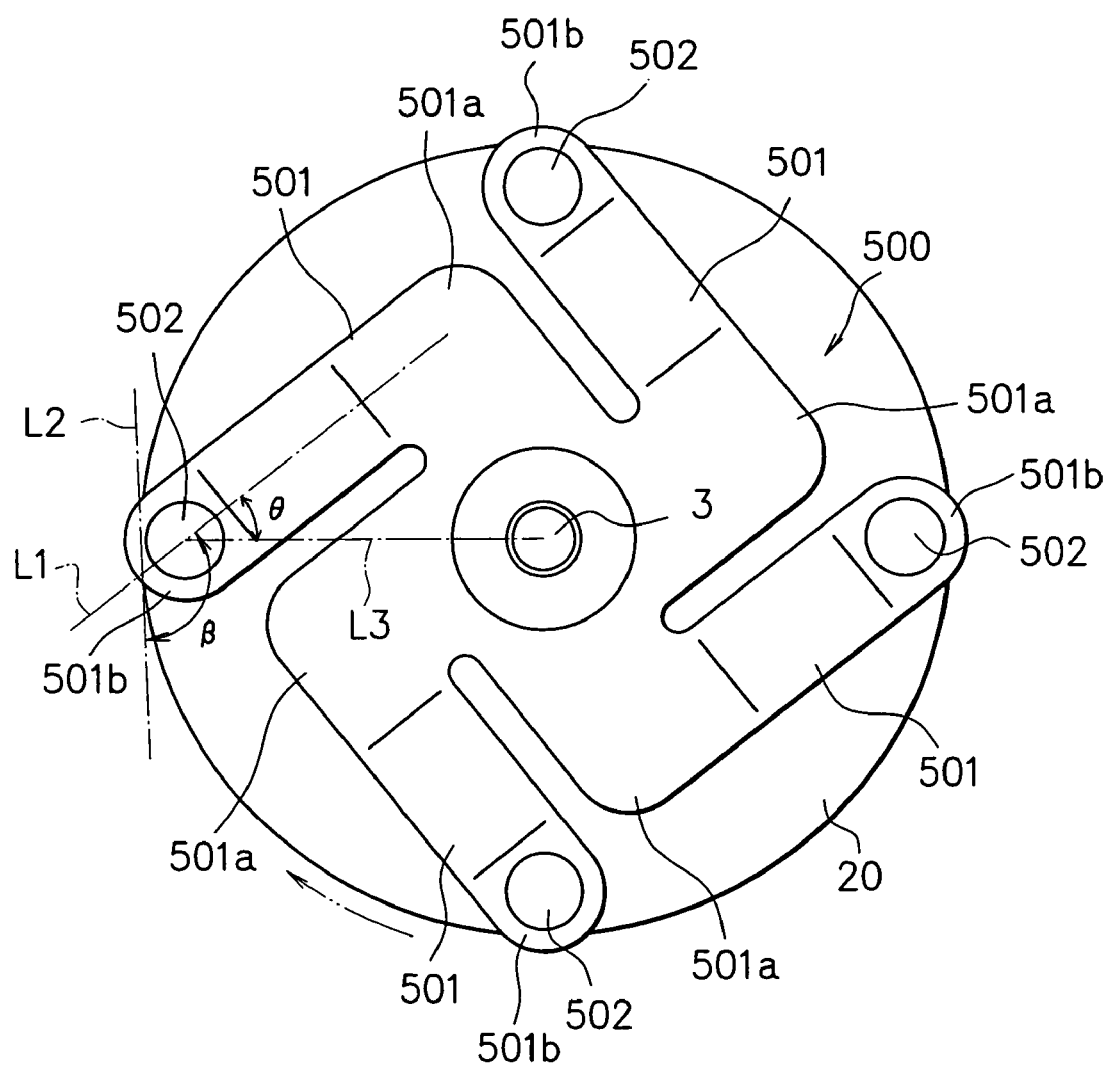
FIG. 9 is a front view of an electromagnetic clutch in accordance with a sixth embodiment.

FIG. 9 shows a sixth embodiment of an electromagnetic clutch. In this embodiment, the same symbols are applied to elements that are common to those in the first embodiment, and the explanation thereof is omitted.

A plate spring 500 in accordance with this embodiment is of a type of being fixed directly on the rotating shaft 3, and is configured so that four spring bodies 501 extend in the radial direction substantially in a fylfot shape. Also, each of the spring bodies 501 has an inclining portion 501c extending from one end 501a thereof toward the other end 501b thereof, and the other end 501b is connected to the armature plate 20 with a rivet 502. Thus, the electromagnetic clutch of a type having no connecting plate also achieves the same operational effects as those of the first embodiment. Other configurations are the same as those of the first embodiment.

Figure 10A:
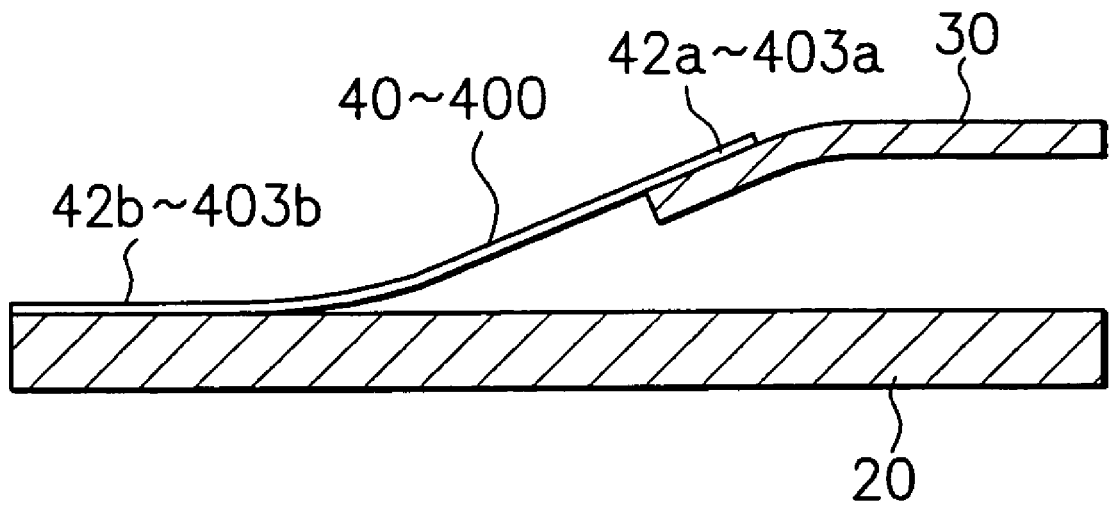
FIGS. 10A and 10B are sectional views of modifications of a plate spring.
Figure 10B:
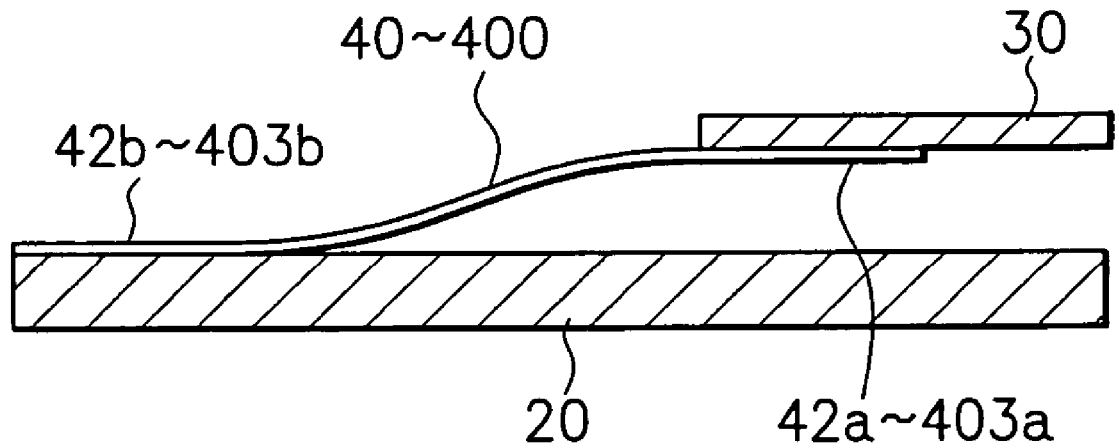

FIGS. 10A and 10B show modifications of the plate spring 40, 100, 200, 300 or 400 in accordance with the above-described embodiments. FIG. 10A shows an example in which one end 42a, 102a, 200a, 300a or 403a of the plate spring 40 to 400 is formed on the upper surface of the connecting plate 30, and FIG. 10B shows an example in which one end 42a to 403a of the plate spring 40 to 400 is formed on the lower surface of the connecting plate 30.

In the example shown in FIG. 10A, a plate spring connecting portion of the connecting plate 30 is bent slantwise downward. One end 42a to 403a of the plate spring 40 to 400 is fixed to the bent portion of the connecting plate 30 with a rivet, and the other end 42b, 102b, 200b, 300b or 403b thereof is fixed to the upper surface of the armature plate 20 with a rivet. A portion close to the other end of the plate spring 40 to 400 is curved gently toward the upper surface of the armature plate 20.

On the other hand, in the example shown in FIG. 10B, a portion close to one end 42a to 403a which is riveted to the lower surface of the connecting plate 30 is curved gently toward the upside, and a portion close to the other end 42b to 403b which is riveted to that upper surface of the armature plate 20 is curved gently toward the armature plate 20.

Since the plate spring 40 to 400 is not formed with a sharply bent portion as described above, stress concentration on the plate spring 40 to 400 can be prevented. Even in the case where the plate spring 40 to 400 has a bent portion, the plate spring 40 to 400 may be designed so that this bent portion has a round shape with a relatively large diameter.

According to the above-described embodiments, the attracting force of the armature plate 20 to the rotor 10 is increased by the construction of the plate spring 40 to 400. However, the attracting force may be increased by increasing the facing area of the armature plate 20 and the rotor 10. Also, in order to increase the fixing strength of the plate spring 40 to 400, in addition to the rivet fixing, a protrusion-shaped rib (not shown) may be provided on the plate spring 20 to 400 so that this rib is connected to the connecting plate 30 or the armature plate 20.

What is claimed is:

1. An electromagnetic clutch comprising:
    an electromagnet coil through which a current is caused to flow;
    a rotor to which power is transmitted from the outside;
    an armature plate facing to the rotor with a clearance provided therebetween; and
    a plate spring comprising one end connected to a main shaft side of a driving source by a first connecting portion and another end connected to the armature plate by a second connecting portion, wherein an elastic force of the plate spring separates the armature plate from the rotor when the electromagnetic coil is in a deenergized state, and the armature plate is attracted to the rotor by magnetomotive force when the electromagnetic coil is energized, an angle formed between the plate spring and the armature plate is between 10° and 63°, and an extension direction of the plate spring extending from the one end of the plate spring toward the another end thereof intersects a tangent line at the armature plate and forms an obtuse angle with the tangent line on a side including the main shaft, and the extension direction of the plate spring intersects, at an acute angle, a connecting line direction extending from a center of the main shaft to a center of the second connecting portion, wherein the plate spring has an arcuate shape bending in a rotation direction of the armature plate from the another end of the plate spring to the one end of the plate spring.

2. The electromagnetic clutch according to claim 1, wherein the plate spring is connected to a connection member at the first connection portion and the connection member connects the plate spring to the main shaft.

3. The electromagnetic clutch according to claim 2, wherein at least one of a first portion of the plate spring close to the one end of the plate spring in the extension direction of the plate spring and a second portion of the plate spring close to the another end thereof in the extension direction of the plate spring is curved.

4. The electromagnetic clutch according to claim 1, wherein at least one of a first portion of the plate spring close to the one end of the plate spring in the extension direction of the plate spring and a second portion of the plate spring close to the another end thereof in the extension direction of the plate spring is curved.

* * * * *